United States Patent
Chiang et al.

(10) Patent No.: US 9,672,426 B2
(45) Date of Patent: Jun. 6, 2017

(54) INTELLIGENT MONITORING SYSTEM

(71) Applicant: Challentech International Corporation, Zhubei (TW)

(72) Inventors: Chung-I Chiang, Zhongli (TW); Yun-Kuei Chiu, New Taipei (TW)

(73) Assignee: Chung-I Chiang, Zhongli (TW)

(*) Notice: Subject to any disclaimer, the term of this patent is extended or adjusted under 35 U.S.C. 154(b) by 242 days.

(21) Appl. No.: 14/550,707

(22) Filed: Nov. 21, 2014

(65) Prior Publication Data

US 2015/0213317 A1 Jul. 30, 2015

(30) Foreign Application Priority Data

Jan. 28, 2014 (TW) .............................. 103103087 A

(51) Int. Cl.
| | | |
|---|---|---|
| H04N 9/00 | (2006.01) | |
| A61B 5/00 | (2006.01) | |
| G06K 9/00 | (2006.01) | |
| H04N 5/33 | (2006.01) | |
| G08B 21/04 | (2006.01) | |
| G08B 29/18 | (2006.01) | |
| G08B 21/02 | (2006.01) | |
| G08B 25/00 | (2006.01) | |
| G08B 25/08 | (2006.01) | |

(52) U.S. Cl.
CPC ..... *G06K 9/00771* (2013.01); *G06K 9/00342* (2013.01); *G08B 21/043* (2013.01); *G08B 21/0476* (2013.01); *G08B 29/185* (2013.01); *H04N 5/33* (2013.01)

(58) Field of Classification Search
CPC . H04H 9/00; A61B 5/00; G08B 21/02; G08B 25/00; G08B 25/08
USPC ...... 348/61, 67, 143, 153, 154, 155; 725/12, 725/9, 10, 18
See application file for complete search history.

(56) References Cited

U.S. PATENT DOCUMENTS

2003/0033600 A1* 2/2003 Cliff ........................ H04H 60/32
725/12

FOREIGN PATENT DOCUMENTS

JP 2009-279076 * 3/2009 ............... A61B 5/00

OTHER PUBLICATIONS

Machine translation of JP2009-279076, Yoshizawa Masahiro, Mar. 2009, Monitoring System.*

* cited by examiner

*Primary Examiner* — Daquan Zhao
(74) *Attorney, Agent, or Firm* — Wang Law Firm, Inc.

(57) ABSTRACT

An intelligent monitoring system for care place is illustrated. The system includes a thermal camera capturing a thermal image of the care place; an image processing unit obtaining user's position and number of user according to region in which temperature is higher than a preset temperature in the thermal image; a temperature recording unit extracting and records user's temperature from the thermal image. When there is only one user, a abnormal event determining unit of the system determines whether an abnormal event occurs according to user's temperature changing rate. When there are several users, the abnormal event determining unit determines whether the abnormal event occurs according to both of the temperature changing rates of the users and an average temperature of the users. If the abnormal event occurs, the warning unit generates a warning signal.

9 Claims, 8 Drawing Sheets

INTELLIGENT MONITORING SYSTEM

CROSS-REFERENCE TO RELATED APPLICATION

This application claims the benefit of Taiwan Patent Application No. 103103087, filed on Jan. 28, 2014, in the Taiwan Intellectual Property Office, the disclosure of which is incorporated herein in its entirety by reference.

BACKGROUND OF THE INVENTION

1. Field of the Invention

The present invention generally relates to a monitoring system, more particularly, to a contactless monitoring system capable of monitoring cared person's temperature and detecting an abnormal event.

2. Description of the Related Art

As society develops maturely, people pay more attention to healthcare quality, particularly to the care environment. However, the traditional care environment requires a great deal of manpower, but at present the healthcare assistants are not enough for a long time. Therefore, what is need is to reduce the healthcare manpower required in care place by using an intelligent monitoring system.

In addition, the cared person must stay in the care place for a long time, and sleep or bath in the care place. Therefore, it is important that the privacy of the cared person must be protected from being infringed by the intelligent monitoring system.

SUMMARY OF THE INVENTION

Therefore, an aspect of exemplary embodiments of the present disclosure directs to an intelligent monitoring system in which a thermal camera measures temperature of the cared person by a contactless way, so the cared person can move free in the care place and the inconvenience caused by measuring temperature of the cared person can be minimized.

An aspect of exemplary embodiments of the present disclosure directs to an intelligent monitoring system in which the privacy of the user is prevented from being infringed by using thermal camera to capture thermal images of the care place.

An exemplary embodiment of the present disclosure provides an intelligent monitoring system which is adapted for a care place. The intelligent monitoring system comprises a thermal camera, an image processing unit, a temperature recording unit, an abnormal event determining unit and a warning unit. The thermal camera captures a thermal image of the care place. The image processing unit obtains a position and number of user in the care place according to at least one region in which temperature is higher than a preset temperature in the thermal image. The temperature recording unit is configured for extracting a temperature of the user from the thermal image, and recording the temperature. The abnormal event determining unit is configured for determining whether an abnormal event occurs according to temperature changing rate of the user when there is one user, and determining whether the abnormal event occurs according to the temperature changing rate and an average temperature of the users when there are multiple users. The warning unit generates a warning signal when the abnormal event determining unit determines that the abnormal event occurs.

Preferably, the intelligent monitoring system according to the present disclosure further comprises a position tracking unit to track the position of the user, when the position tracking unit determines the user to be at a first preset region and the abnormal event determining unit determines that the user remains motionless for longer than a predefined time, the abnormal event determining unit determines that the user is in sleep. When the position tracking unit determines the user not to be at first preset region and the abnormal event determining unit determines that the user remains motionless for longer than the predefined time, the abnormal event determining unit determines that the abnormal event occurs.

Preferably, when the position tracking unit determines that the user is at the second preset region, the abnormal event determining unit decreases the thermal threshold of determining occurrence of the abnormal event.

Preferably, when there are multiple thermal cameras, the multiple thermal cameras capture thermal images of the first preset region and the second preset region, respectively.

Preferably, the care place may be a ward, and the first preset region may be a region where a sickbed located in the ward, and the second preset region may be a region where a bathroom located in the ward.

Preferably, when the abnormal event determining unit determines decreasing or increasing of the temperature of one user to exceed a threshold, the abnormal event determining unit also then determines whether the temperature of other user also decreases or increases, if yes, the abnormal event determining unit determines no abnormal event occurs; if no, the abnormal event determining unit determines the abnormal event occurs.

Preferably, the abnormal event determining unit further determines whether the abnormal event occurs according to history temperature data of the user.

Preferably, the care place includes a ward, a nurse place, a nursery, a labor room, a child care place, a nursery or an elderly care place.

Preferably, when the care place is the ward, a nurse or a care assistant is noticed by a reminding signal in acoustic way or visible way, the temperature recording unit transmits the temperature of the user to a nurse or a care assistant.

Preferably, the position tracking unit tracks a specific person of multiple users continuously, and the abnormal event determining unit determines whether the abnormal event occurs according to the changing rate of the temperature of the specific person.

An exemplary embodiment of the present disclosure provides an intelligent monitoring system which is adapted for a care place. The intelligent monitoring system comprises a thermal camera, an image processing unit, a temperature recording unit, an abnormal event determining unit and a warning unit. The thermal camera captures a thermal image of the care place. The image processing unit is configured for determining a user in the care place according to a region in which the temperature is higher than a preset temperature in the thermal image. The temperature recording unit is configured for extracting multiple highest temperatures within the region of the thermal image, and determining an average value of the multiple highest temperatures as a temperature of the user, and recording the temperature. The abnormal event determining unit is configuring for determining whether an abnormal event occurs according to a changing rate of the temperature of the user. The warning unit generates a warning signal when the abnormal event determining unit determines that the abnormal event occurs.

Another exemplary embodiment of the present disclosure provides an intelligent monitoring system which is adapted for a care place. The intelligent monitoring system comprises a thermal camera, an image processing unit, a temperature recording unit, an abnormal event determining unit, a face identification unit and a warning unit. The thermal camera captures a thermal image of the care place. The image processing unit is configured for determining a user in the care place according to a region in which the temperature is higher than a preset temperature in the thermal image. The face identification unit is configured for identifying a face of the user from the region. The temperature recording unit is configured for extracting a temperature of the user from a specific position of the face, and recording the temperature. The abnormal event determining unit is configuring for determining whether an abnormal event occurs according to a changing rate of the temperature of the user. The warning unit generates a warning signal when the abnormal event determining unit determines that the abnormal event occurs.

Preferably, the specific position is a forehead which is defined as the position upper from a center point between the two eyes by a preset distance.

Another exemplary embodiment of the present disclosure provides an intelligent monitoring system which is adapted for a care place. The intelligent monitoring system comprises a thermal camera, an image processing unit, a temperature recording unit, an abnormal event determining unit, a position tracking unit and a warning unit. The thermal camera captures a thermal image of the care place. The image processing unit is configured for determining a user in the care place according to a region in which the temperature is higher than a preset temperature in the thermal image. The temperature recording unit is configured for extracting a temperature of the user from the thermal image, and recording the temperature. The position tracking unit is configuring for tracking a position of the user. When the position tracking unit determines the user to be at first preset region and the abnormal event determining unit determines that the user remains motionless for longer than a predefined time, the abnormal event determining unit determines the user to be in sleep. When the position tracking unit determines the user not to be at first preset region and the abnormal event determining unit determines that the user remains motionless for longer than the predefined time, the abnormal event determining unit determines that the abnormal event occurs. The warning unit generates a warning signal when the abnormal event determining unit determines that the abnormal event occurs.

Preferably, when the position tracking unit determines the user to be at the second preset region, the abnormal event determining unit decreases the thermal threshold of determining occurrence of the abnormal event.

Preferably, when there are multiple thermal cameras, the multiple thermal cameras capture thermal images of the first preset region and the second preset region, respectively.

Preferably, the temperature recording unit is a cloud server, and the cloud server receives the temperature via a wired network or a wireless network.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Figure 1:
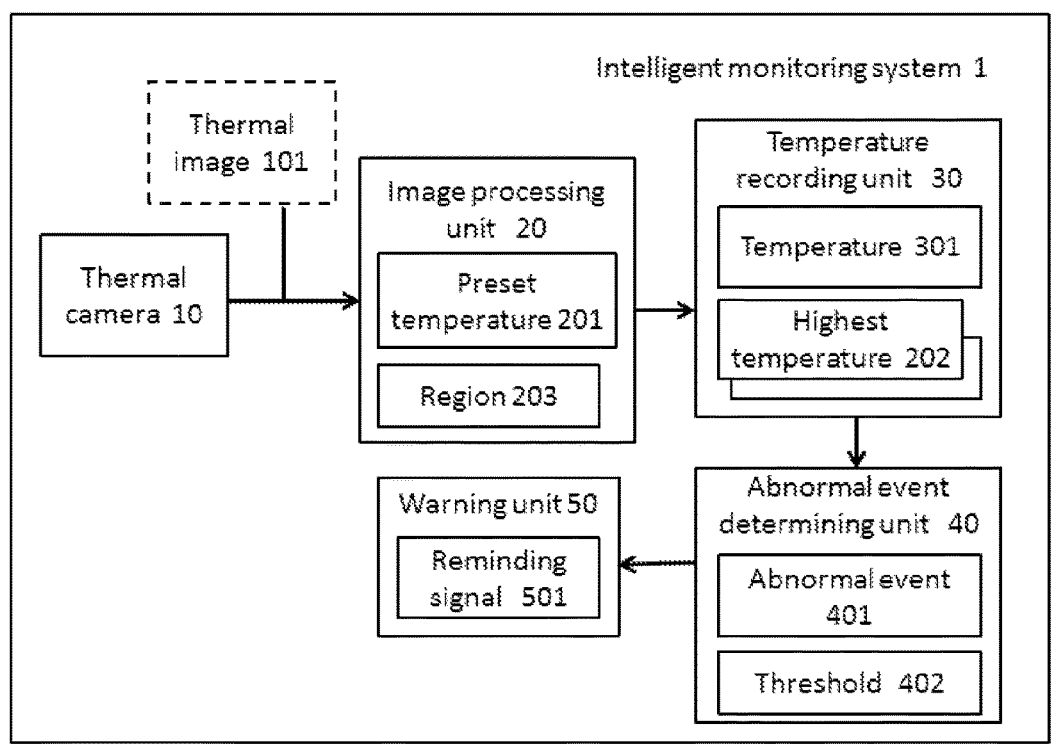
FIG. 1 is a block diagram of a first embodiment according to the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
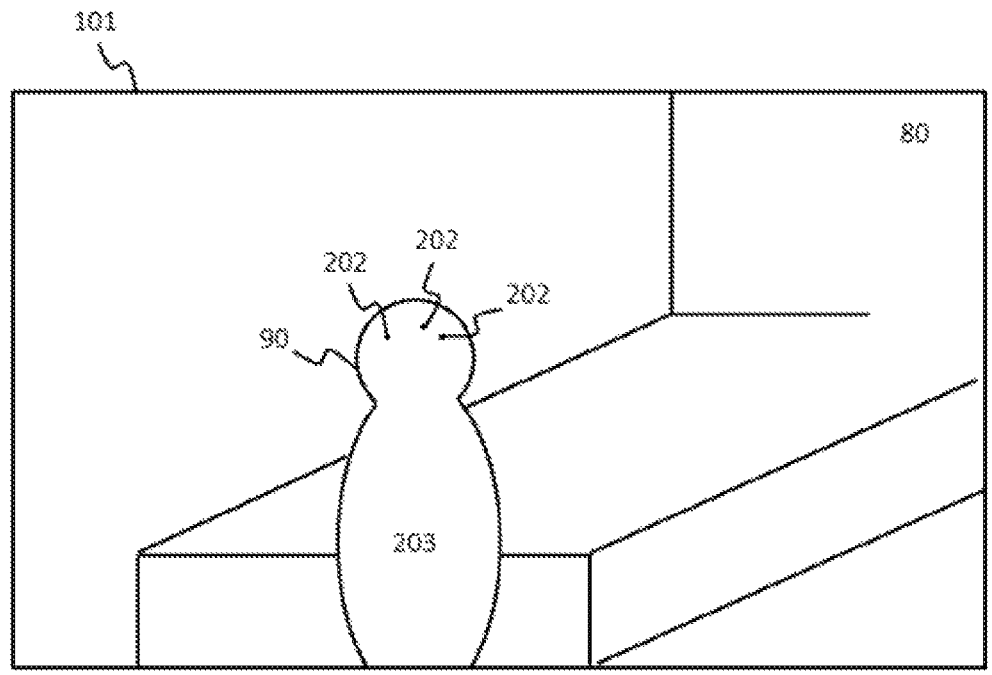
FIG. 2 is a schematic view of the first embodiment according to the present disclosure.
Figure 3:
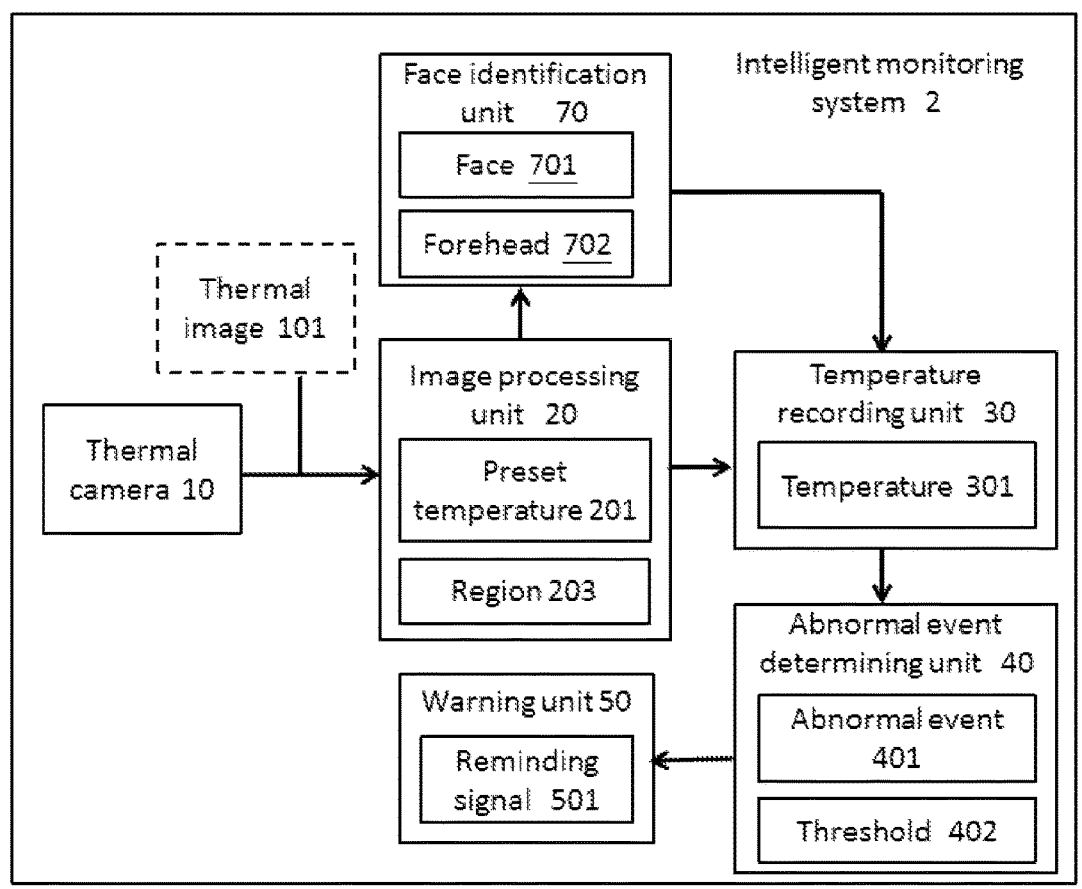
FIG. 3 is a block diagram of a second embodiment according to the present disclosure.

Refer to FIG. 1 and FIG. 2 which are block diagram and schematic view of a first embodiment according to the present disclosure, respectively. An intelligent monitoring system adapted for a care place 80, and comprises a thermal camera 10, an image processing unit 20, a temperature recording unit 30, an abnormal event determining unit 40 and a warning unit 50.

The thermal camera 10 captures a thermal image 101 of the care place 80. The thermal camera 10 is calibrated already, so each pixel within the thermal image 101 can correspond to a temperature value. Generally, the temperature of human body is higher than that of environment in the care place 80, so the image processing unit 20 can determine position of the user 90 in the care place 80 according to a region 203 in which the temperature is higher than a preset temperature 201 in the thermal image 101. In addition, the area or shape of the region 203 can be used for determination, to filter a coffee, a heater or food with high temperature.

In implementation, the thermal camera 10 comprises an infrared thermography or an infrared imager, and the image processing unit 20 can be an image processing IC for computing in thermal image, or a CPU to execute an image processing program for processing the thermal image.

After position of the user 90 in the thermal image 101 is determined, the temperature recording unit 30 obtains a temperature 301 of the user 90 from the region 203 of the thermal image 101. Because the area of the region 203 is too large, in order to improve precision of the obtained temperature 301, the position indicative of the body status of the user 90 must be determined form the region 203 first, for further calculating the temperature 301 of the user 90. In first embodiment, the temperature recording unit 30 extracts multiple highest temperatures 202 in the region 203, such as three highest temperatures, and defines an average value of the highest temperatures 202 as the temperature 301 of the user 90, and records the temperature 301.

Basically, the temperatures within the region 203 are distributed continuously, however, a temperature spike may occurs in the region 203, for example, after the user touch an object with high temperature, the touch portion of the user may have high temperature. If the temperature 301 is calculated according to the temperature spike, the temperature 301 may have distortion. Therefore, when the multiple highest temperatures 202 are extracted, it is determined whether each of these highest temperatures 202 are non-continuous with the temperature of the region in neighborhood; if yes, the highest temperature is determined as the temperature spike and should be removed and not involved into calculation for temperature 301.

The abnormal event determining unit 40 determines whether an abnormal event 401 occurs according to a changing rate of the temperature 301 of the user 90. In implementation, the abnormal event determining unit 40 determines whether the temperature 301 of the user 90 decreases or increases exceeding a threshold 402 first, for further determining whether the abnormal event 401 occurs. For example, if the temperature 301 of the user 90 increases 2 degree within 5 minutes, it is possible that the user 90 has a fever being a symptom of illness and should be defined as the abnormal event 401; alternatively, the temperature 301 of the user 90 decreases 2 degree within 5 minutes, it is possible that vital signs of the user 90 becomes weak, and it is also defined as the abnormal event 401.

Except the thermal camera 10, the intelligent monitoring system 1 can further comprise other temperature measuring device, such as contact-type thermometer, to improve the precision of the measured temperature. Advantages of the thermal camera 10 is to measure temperature of the user without contact, and wider detection range, so the user 90 can act in a specific range without affecting the temperature detection. Therefore, the thermal camera 10 serves as the main measuring device, and the other temperature measuring device serves as the auxiliary measuring device.

In addition, the abnormal event determining unit 40 further determines whether the abnormal event 401 occurs according to history temperature data of the user 90. The history temperature data can be generated by the temperature recording unit 30.

The warning unit 50 generates a warning signal 501 when the abnormal event determining unit 40 determines that the abnormal event 401 occurs. The care place 80 includes a ward, a nurse place, a nursery, a labor room, a child care place, a nursery or an elderly care place, and the user 90 can be a cared person, such as a patient, child, baby or elder person. If the care place is the ward, a nurse or a care assistant will be noticed by the reminding signal 501 in acoustic way or visible way, and the temperature recording unit 30 transmits the temperature 301 of the user 90 to the nurse or the care assistant.

Figure 4:
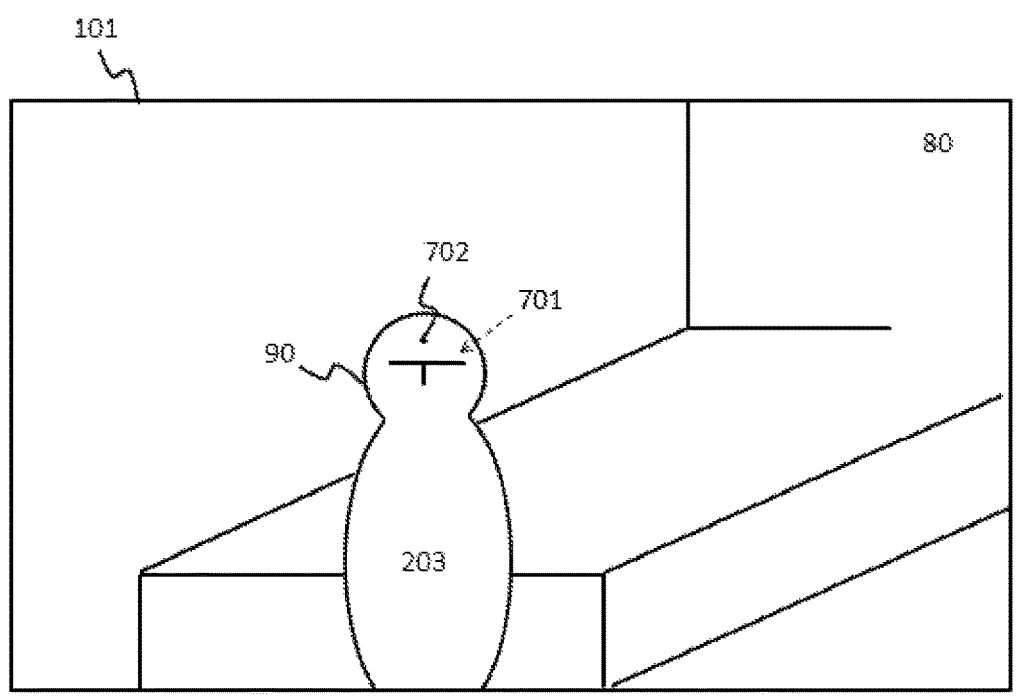
FIG. 4 is a schematic view of the second embodiment according to the present disclosure.

Refer to FIG. 1 and FIG. 4 which are block diagram and schematic view of a second embodiment according to the present disclosure, respectively. The intelligent monitoring system 2 comprises a thermal camera 10, an image processing unit 20, a face identification unit 70, a temperature recording unit 30, an abnormal event determining unit 40 and a warning unit 50. The thermal camera 10 can capture a thermal image 101 of the care place 80. The image processing unit 20 can determine a position of the user 90 in the care place 80 according to a region 203 in which temperature is higher than a preset temperature 201 in the thermal image 101.

The difference between the second embodiment and the first embodiment is that the face identification unit 70 can identify face 701 of the user 90 from the region 203. The temperature recording unit 30 extracts a temperature 301 of the user 90 from a specific position of the face 701, and recording the temperature 301. The forehead is the position most indicative of the temperature of head of human body. If the user 90 has a fever, the temperature of the forehead responses first. Therefore, the forehead 702 can be set as the specific position. In implementation, the forehead 702 can be defined as the position upper from a center point between the two eyes by a preset distance, for example, on the direction opposite to the nose and the mouth. Therefore, even though the user 90 moves or turns over, the intelligent monitoring system 2 identifies the forehead 702 of the user 90 if possible, and the temperature of the forehead 702 is used as the temperature 301 of the user 90 to determine whether the abnormal event 401 occurs. In other embodiment, the phitrum can be set as the specific position.

In addition, the way of obtaining the average value of the multiple highest temperatures in the first embodiment can also be applied in the second embodiment, for example, the average value of the multiple highest temperatures near the forehead 702 can be defined as the temperature 301 of the user.

The functions or effects of the abnormal event determining unit 40 and the warning unit 50 of the intelligent monitoring system 2 are the same as the intelligent monitoring system 1, so their detail description is omitted.

Figure 5:
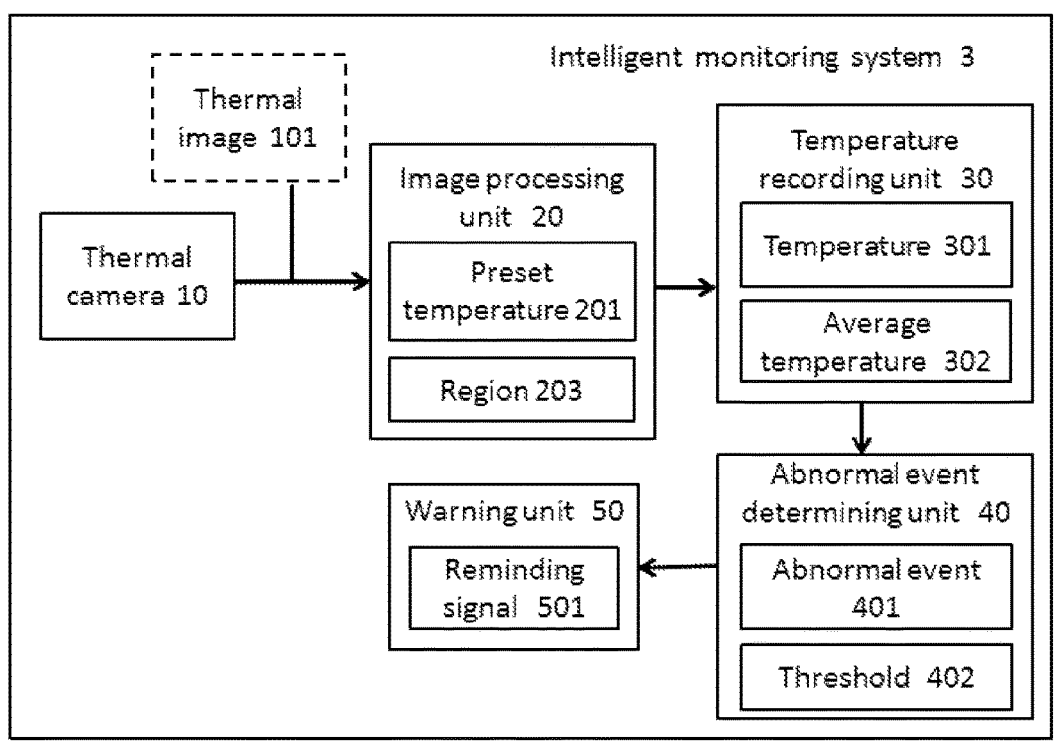
FIG. 5 is a block diagram of a third embodiment according to the present disclosure.
Figure 6:
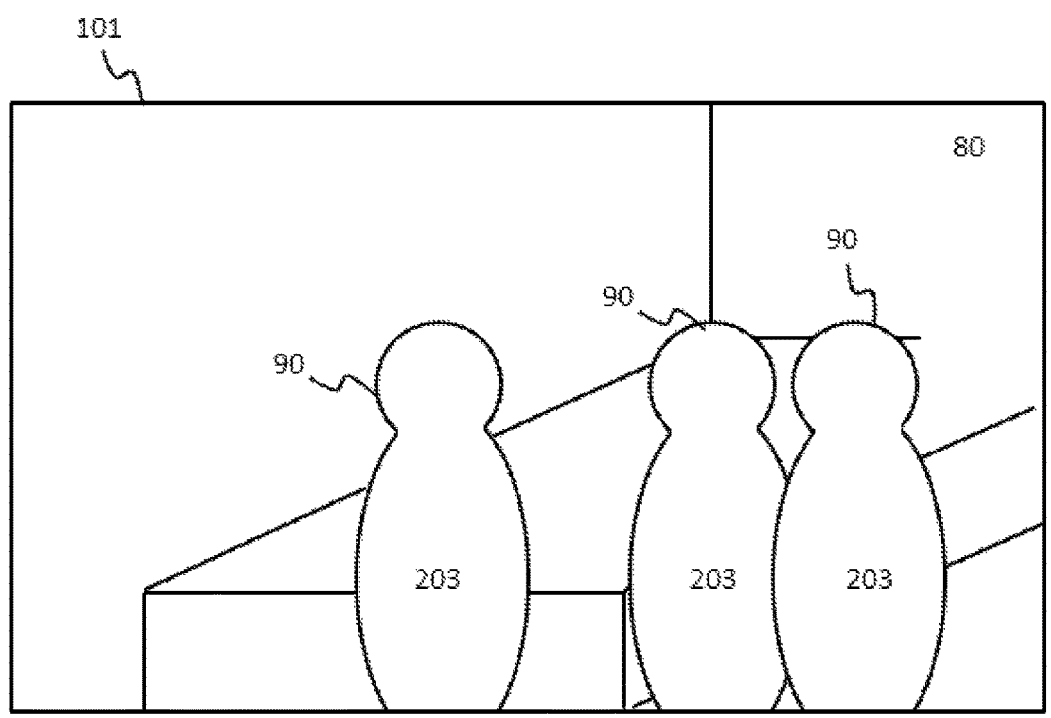
FIG. 6 is a schematic view of the third embodiment according to the present disclosure.
Figure 7:
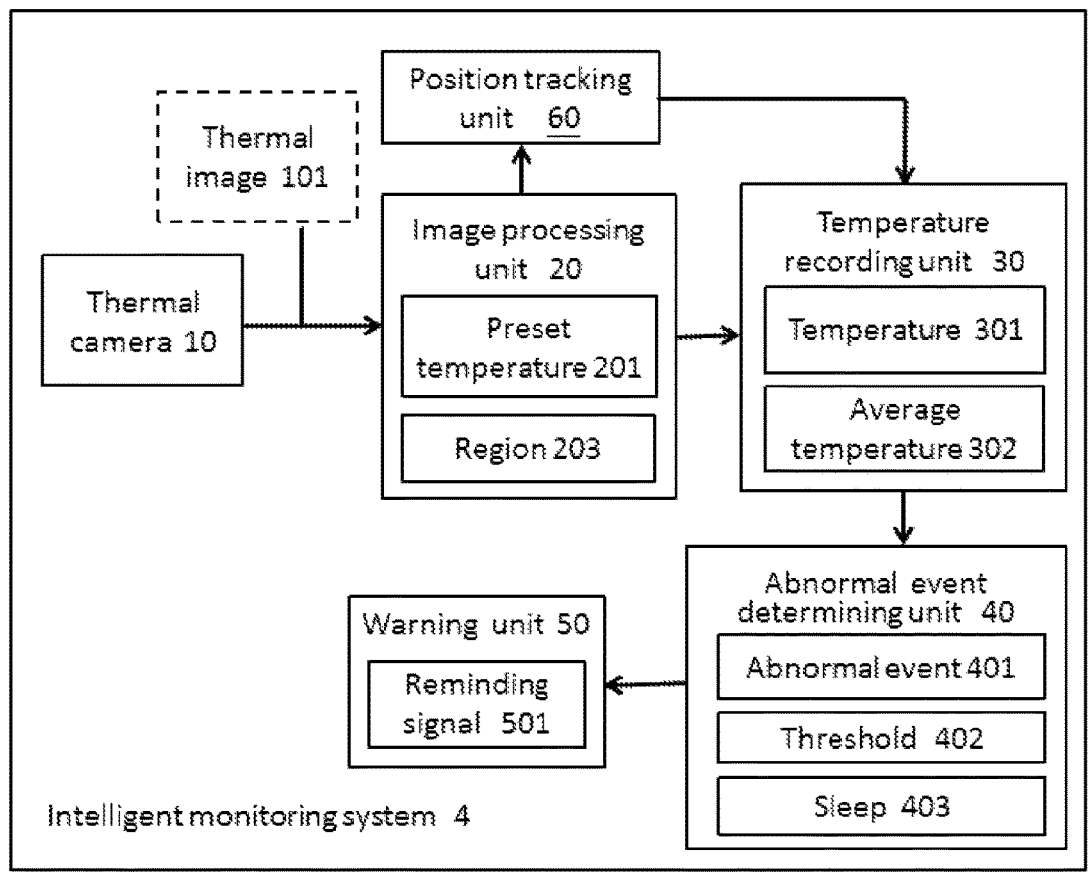
FIG. 7 is a block diagram of a fourth embodiment according to the present disclosure.

Refer to FIG. 5 and FIG. 6 which are block diagram and schematic view of a third embodiment according to the present disclosure. The third embodiment is for a condition that there are multiple users in the care place 80. The intelligent monitoring system 3 comprises a thermal camera 10, an image processing unit 20, a temperature recording unit 30, an abnormal event determining unit 40 and a warning unit 50. The functions or effects of the thermal camera 10, the image processing unit 20 and the temperature recording unit 30 of the intelligent monitoring system 3 is the same as that of the intelligent monitoring system 1 or the intelligent monitoring system 2, so their detail description is omitted.

The difference between the intelligent monitoring system 3 and the intelligent monitoring system 1 or the intelligent monitoring system 2 is that when it is determined that only one person stays in the care place 80 according to number of the region 203, the abnormal event determining unit 40 determines whether the abnormal event 401 occurs according to the changing rate of the temperature 301 of the user 90. When it is determined that multiple users 90 stay in the care place 80, the abnormal event determining unit 40 determines whether the abnormal event 401 occurs according to both of the changing rate of the temperatures 301 of the users 90 and an average temperature 302 of the multiple users 90.

The temperature 301 of user 90 obtained by the temperature recording unit 30 may be affected by the environment temperature. For example, when the air conditioner in the care place 80 is turned on, the environment temperature will decrease and cause the temperature 301 of the user 90 to decrease. Otherwise, when the warming machine in the care place 80 is turned on, the environment temperature will increase and cause the temperature 301 of the user 90 to increase. If the change of the temperature 301 caused by the environment temperature is determined as occurrence of the abnormal event 401, it is a wrong determination.

Therefore, when there are multiple users 90, the environment temperature should cause the changes of the temperatures 301 of whole users, and the abnormal event determining unit 40 additionally considers the average temperature 302 of multiple users 90 for determination, to decrease the possibility of wrong determination.

That is, when the abnormal event determining unit 40 determines that decreasing or increasing of the user 90's temperature 301 exceeds a threshold 402, the abnormal event determining unit 40 then determines whether other use's temperature 301 also decrease or increase, if yes, the abnormal event determining unit 40 determines no abnormal event 401 occurs. If no, the abnormal event determining unit 40 determines the abnormal event 401 occurs.

The functions or effects of the abnormal event determining unit 40 and the warning unit 50 of the intelligent monitoring system 3 are the same as that of above-mentioned intelligent monitoring system, so their detail description is omitted.

In addition, the function illustrated in the first embodiment and the second embodiment can also be applied in the third embodiment, such as the way of defining the average value of the multiple highest temperatures as the temperature 301 of the user, or the application of the face identification unit 70.

Figure 8:
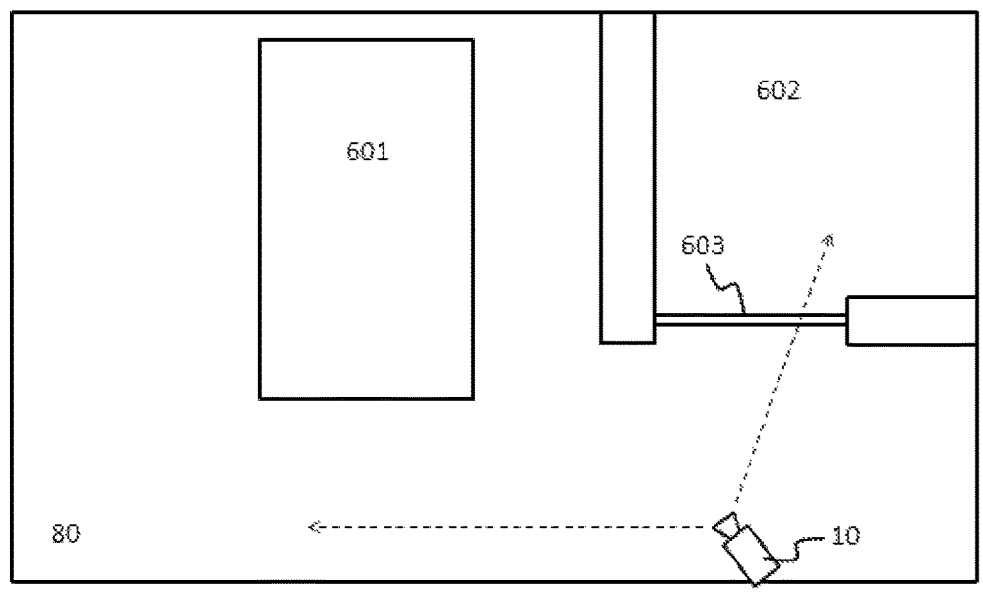
FIG. 8 is a first schematic view of the fourth embodiment according to the present disclosure.
Figure 9:
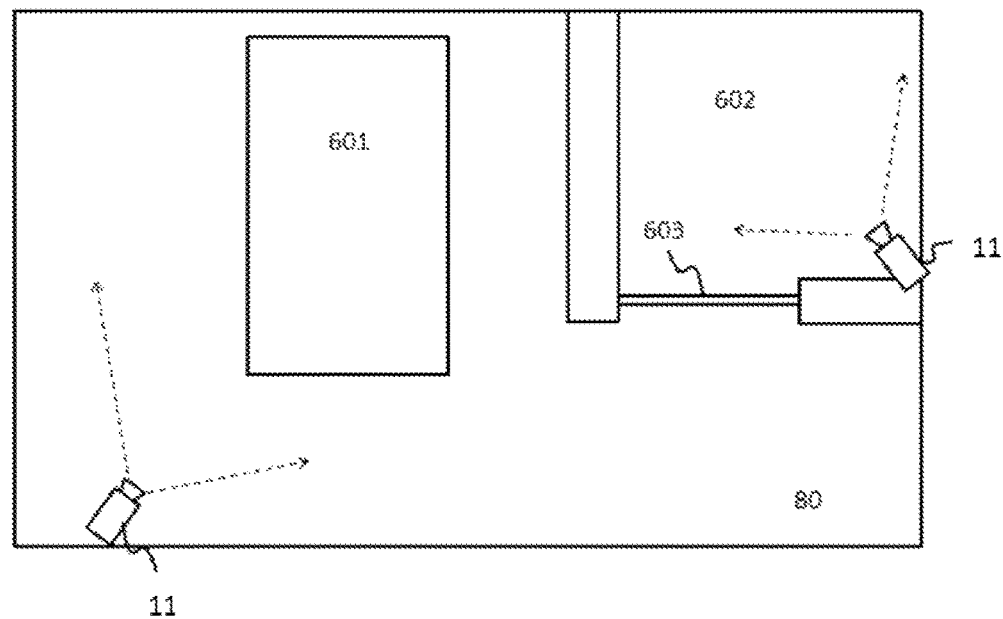
FIG. 9 is a second schematic view of the fourth embodiment according to the present disclosure.

Refer to FIG. 8 and FIG. 9 which are block diagram, a first schematic view and a second schematic view of a fourth embodiment according to the present disclosure. The fourth embodiment is particular for tacking and monitoring the user 90 in the care place 80. The intelligent monitoring system 4 comprises a thermal camera 10, an image processing unit 20, a temperature recording unit 30, an abnormal event determining unit 40, a position tracking unit 60 and a warning unit 50. The functions or effects of the thermal cameras 10 and 11, and an image processing unit 20 of the intelligent monitoring system 4 are the same as that of the above-mentioned embodiments, so their detail description is omitted.

The different between the fourth embodiment and other embodiments is that the intelligent monitoring system 4 further comprises a position tracking unit 60 configured for tracking the position of the user 90. The care place 80 includes a first preset region 601 and a second preset region 602. For example, if the care place 80 is a ward, the first preset region 601 may be a region 203 where a sickbed located in the ward, and the second preset region 602 may be a region 203 where a bathroom located in the ward.

When the position tracking unit 60 determines the user 90 to be at first preset region 601 and the abnormal event determining unit 40 determines that the user 90 remains motionless for longer than a predefined time, the abnormal event determining unit 40 determines the user 90 to be in sleep 403. The first preset region 601 may be set as a sickbed region, and the user is in sleep when the user remains motionless on the sickbed, so that the abnormal event 401 is not determined to occur unless the temperature 301 changes abnormally.

In implementation, if the difference of pixels between the regions 203 among multiple thermal images 101 is lower than a specific proportion of total area of the region 203, such as 3%, the user 90 is determined to remain motionless. The frame number of the thermal image 101 can be adjusted upon demand. The 3% is just for example, and the present disclosure is not limited thereto.

When the position tracking unit 60 determines the user 90 not to be at first preset region 601 and the abnormal event determining unit 40 determines that the user 90 remains motionless for longer than the predefined time, it means that the user is not on the sickbed, the abnormal event determining unit 40 determines that the abnormal event 401 occurs. For example, the user may fall down on the ground and remain motionless. In this case, it should be defined as the abnormal event 401 and the care person must be reminded. The action and effect of the warning unit 50 is the same as that of the above-mentioned intelligent monitoring system, so the detail description is omitted.

In addition, if the area of the region 203 within two or three frames of thermal images 101 has large change, for example, the change is larger than 30% of the total area of the region 203, it is determined that the user 90 falls down and the abnormal event 401 occurs. The frame number of the thermal image 101 can be adjusted upon demand. The 30% is just for example, and the present disclosure is not limited thereto.

In addition, when the position tracking unit 60 determines that the user 90 is at the second preset region, such as the bathroom 203, the abnormal event determining unit 40 decreases the thermal threshold of determining occurrence of the abnormal event 401. For example, when the user 90 enters the bathroom region 203 and closes door, the temperature of the region 203 of the thermal image 101 captured by the thermal camera 10 decreases due to block of the door 603 or wall, and the detection sensitivity also decreases. However, such temperature change in this case should not be defined as the abnormal event 401. Therefore, the abnormal event determining unit 40 may decrease the temperature threshold for determining the occurrence of the abnormal event 401, to prevent from misjudgments.

In addition, the intelligent monitoring system 4 may comprise multiple thermal cameras 11, as shown in FIG. 9. the multiple thermal cameras 11 capture the thermal images 101 of the first preset region 601 and the second preset region 602 respectively, which results in preventing the detection sensitivity from being decreased. Therefore, the abnormal event determining unit 40 does not need to decrease the temperature threshold for determining the occurrence of the abnormal event 401. In addition, multiple thermal cameras 10 can cover imaging range of each other.

Moreover, the position tracking unit 60 can track a specific person of multiple users continuously, and the abnormal event determining unit 40 judges whether the abnormal event 401 occurs according to the changing rate of the temperature 301 of the specific person.

In addition, the intelligent monitoring system 4 may comprise a gesture identification unit which can determine a gesture of the user 90 according to multiple frames of the thermal image 101. For example, when it is determined that the user is waving hand for help, the abnormal event 401 occurs.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An intelligent monitoring system, adapted for a care place, the intelligent monitoring system comprising:
a thermal camera, configured for capturing a thermal image of the care place;
an image processing unit, configured for obtaining location and number of user according to a region in which temperature is higher than a preset temperature in the thermal image;
a temperature recording unit, configured for extracting a temperature of the user from the thermal image, and recording the temperature;
an abnormal event determining unit, configured for determining whether an abnormal event occurs according to a temperature changing rate of the user when there is one user, and determining whether the abnormal event occurs according to the temperature changing rate and an average temperature of the users when there are multiple users;
a warning unit, configured for generating a warning signal when the abnormal event determining unit determines that the abnormal event occurs; and
a position tracking unit to track a position of the user;
wherein when the position tracking unit determines the user to be at first preset region and the abnormal event determining unit determines that the user remains motionless for a period exceeding a predefined time, the abnormal event determining unit determines the user is in sleep; and wherein when the position tracking unit determines the user not to be at first preset region and the abnormal event determining unit determines that the user remains motionless for longer than the predefined time, the abnormal event determining unit determines that the abnormal event occurs.

2. The intelligent monitoring system according to claim 1, wherein when the position tracking unit determines that the user is at a second preset region, the abnormal event determining unit decreases the thermal threshold of determining the occurrence of the abnormal event.

3. The intelligent monitoring system according to claim 2, wherein when there are multiple thermal cameras, the multiple thermal cameras respectively captures thermal images of the first preset region and the second preset region.

4. The intelligent monitoring system according to claim 3, wherein the care place is a ward and the first preset region is a region where a sickbed located in the ward, and the second preset region is a region where a bathroom located in the ward.

5. The intelligent monitoring system according to claim 1, wherein when the abnormal event determining unit determines that decreasing or increasing of the user's temperature exceeds a threshold, the abnormal event determining unit then determines whether other user's temperature also decreases or increases;
if other user's temperature also decreases or increases, the abnormal event determining unit determines the abnormal event does not occur; otherwise, if other user's temperature does not decreases or increases, the abnormal event determining unit determines the abnormal event occurs.

6. The intelligent monitoring system according to claim 1, wherein the abnormal event determining unit further determines whether the abnormal event occurs according to a history temperature data of the user.

7. The intelligent monitoring system according to claim 1, wherein the care place includes a ward, a nurse place, a nursery, a labor room, a child care place, a nursery or an elderly care place.

8. The intelligent monitoring system according to claim 7, wherein when the care place is the ward, a nurse or a care assistant is noticed by the reminding signal in acoustic way or visible way, and the temperature recording unit transmits the temperature of the user to the nurse or the care assistant.

9. The intelligent monitoring system according to claim 1, wherein the position tracking unit tracks a specific person of the multiple users continuously, and the abnormal event determining unit determines whether the abnormal event occurs according to the changing rate of the temperature of the specific person.

* * * * *